US010261972B2

(12) United States Patent
Sularia et al.

(10) Patent No.: US 10,261,972 B2
(45) Date of Patent: Apr. 16, 2019

(54) METHODS AND SYSTEMS FOR SIMILARITY MATCHING (71) Applicant: IntelligenceNODE Consulting Private Limited, Mumbai (IN)

(72) Inventors: Sanjeev Sularia, Mumbai (IN); Yasen Dimitrov, Pernik (BG); Slavcho Ivanov, Sofia (BG)

(73) Assignee: IntelligenceNODE Consulting Private Limited, Mumbai (IN)

( * ) Notice: Subject to any disclaimer, the term of this patent is extended or adjusted under 35 U.S.C. 154(b) by 233 days.

(21) Appl. No.: 15/258,533

(22) Filed: Sep. 7, 2016

(65) Prior Publication Data

US 2018/0067944 A1 Mar. 8, 2018

(51) Int. Cl.
*G06F 17/30* (2006.01)
*G06F 16/9535* (2019.01)
(52) U.S. Cl.
CPC .............................. *G06F 16/9535* (2019.01)

(58) Field of Classification Search
None
See application file for complete search history.

(56) References Cited

U.S. PATENT DOCUMENTS

| 7,577,643 | B2 * | 8/2009 | Dominowska .... | G06F 17/30616 |
| 9,002,857 | B2 * | 4/2015 | Robinson .......... | G06F 17/30722 |
| | | | | 707/749 |
| 2005/0289140 | A1 * | 12/2005 | Ford ................. | G06F 17/30705 |

\* cited by examiner

*Primary Examiner* — Belix M Ortiz Ditren
(74) *Attorney, Agent, or Firm* — Timberline Patent Law Group PLLC (57) ABSTRACT

An efficient and user-friendly system (118) and method for providing contents similar to a searched item is disclosed. The system (118) includes an indexing engine (208) adapted to work in conjunction with a processing engine (206), to discover and provide to the users, content similar to that searched by a user. The system and method search multiple indices to retrieve content with same or similar field values as of the item searched by the user.

8 Claims, 5 Drawing Sheets

METHODS AND SYSTEMS FOR SIMILARITY MATCHING

FIELD OF INVENTION

The present disclosure generally relates to similarity matching systems and methods. More particularly, the present disclosure relates to methods and systems for providing contents similar to a searched item.

BACKGROUND

The following description of related art is intended to provide background information pertaining to the field of the present disclosure. This section may include certain aspects of the art that may be related to various aspects of the present disclosure. However, it should be appreciated that this section be used only to enhance the understanding of the reader with respect to the present disclosure, and not as admissions of prior art.

With the tremendous amount of information made available on the World Wide Web, the need for effective methods for retrieving relevant information in response to search queries has also increased. Typically, a search engine is used to provide search results in response to a search query input by the user. The value of a search engine depends on the relevance of the results it produces. While there are numerous web pages that comprise a particular word or phrase, some pages may be more relevant, popular, or authoritative than others, and such pages must be provided in the search results. Different search engines employ different methods to uncover and subsequently rank and provide search results to users.

Existing web search engines store information about many web pages that are retrieved by a crawler. Typically, a crawler follows every link on each web page on the World Wide Web and stores or saves these pages and/or their content in an index. The purpose of an index is to allow information to be retrieved as quickly as possible when a search is performed. When a user enters keywords into a search engine, the engine examines its index, looks for the words or clusters of words as entered, and provides a list of matching information according to its algorithms and criteria, usually by way of a digest containing the title, parts of the text, design, colour etc.

Electronic commerce (e-commerce) websites also allow users to search for different items on their websites using a search engine. A user may wish to view or retrieve items similar to the item currently being viewed. This functionality is also provided for by the search engines of these e-commerce websites, however, searching for similar items is done in the same manner as discussed above, i.e. by searching for keywords input by the user in an index. The main drawback of existing web search engines, and particularly those used on e-commerce websites, is that for every new search, the engine starts searching from the beginning of the index which slows down the process of retrieving information and in some cases, the retrieved information is not accurate, relevant or as per the expectation of the user. Further, the existing systems are capable of executing a single search query at a time, i.e. the index can be searched for only one search query at a time, resulting in increased processing time of the search queries.

SUMMARY

This section is provided to introduce certain objects and aspects of the disclosed methods and systems in a simplified form that are further described below in the detailed description. This summary is not intended to identify the key features or the scope of the claimed subject matter.

In view of the shortcomings of existing search engines, as discussed in the background section, it is apparent that there exists a need for developing a more efficient system and method for searching contents similar to a searched item that not only overcomes the problems of the prior art but is also advantageously used to find the most relevant similar content. It is therefore an object of the disclosed methods and systems to provide an efficient system and method for providing contents similar to a searched item, such that the system is capable of reducing the response time of the search. More particularly, it is an object of the disclosed methods and systems to provide a system and method for providing contents similar to a first searched item, such that the system and method facilitates processing multiple search queries simultaneously.

In view of these and other objects, one aspect of the present disclosure relates to a system for providing contents similar to a first searched item. The system comprises a request generator that generates one or more requests for providing contents similar to the first searched item; and an extraction unit associated with the request generator, that extracts at least one field/category relating to the first searched item. Further, the system comprises an indexing engine associated with said extraction unit, where the indexing engine processes one or more fields to form one or more combinations thereof, determines a score for each combination based on weight assigned to the fields corresponding to said combination, and also determines a dataset relating to each combination. Further, the system also comprises a processing engine, associated with the extraction unit and the indexing engine, where the processing engine finally provides one or more content similar to the first searched item based on, the score and the dataset, relating to said one or more combinations.

Another aspect of the invention relates to a method for providing contents similar to a first searched item. The method begins with generating one or more requests for providing contents similar to the first searched item. Subsequently, at least one field/category relating to the first searched item is extracted, and said fields are processed to form one or more combinations thereof. This is followed by determining a score for each combination based on weight assigned to the fields corresponding to said combination and determining a dataset relating to each of said combination. Finally, one or more content similar to the first searched item is provided based on, the score and the dataset, relating to said one or more combinations.

BRIEF DESCRIPTION OF DRAWINGS

The accompanying drawings, which are incorporated herein, and constitute a part of this disclosure, illustrate exemplary embodiments of the disclosed methods and systems in which like reference numerals refer to the same parts throughout the different drawings. Some drawings may indicate the components using block diagrams and may not represent the internal circuitry of each component. It will be appreciated by those skilled in the art that disclosure of such drawings include disclosure of electrical components or circuitry commonly used to implement such components.

The foregoing will be apparent from the following more detailed description of example embodiments of the present disclosure, as illustrated in the accompanying drawings.

DETAILED DESCRIPTION OF EXEMPLARY EMBODIMENTS

In the following description, for the purposes of explanation, various specific details are set forth in order to provide a thorough understanding of the disclosed embodiments. It will be apparent, however, that the disclosed embodiments may be practiced without these specific details. Several features described hereafter can each be used independently of one another or with any combination of other features. Although headings are provided, information related to a particular heading, but not found in the section having that heading, may also be found elsewhere in the specification. Further, information provided under a particular heading may not necessarily be a part of only the section having that heading.

A used herein, an "item" refers to any unit of information that can be searched by a user.

As used herein, a "first searched item" refers to any item directly or indirectly searched by a user. In a preferred embodiment, the first searched item is a product or service searched by the user on an e-commerce platform or website.

As used herein, "fields" and "categories" refer to the properties of an item, wherein said properties may be pre-defined or user-defined.

As used herein, a "client device" refers to any computing device, including, but not limit to, a mobile phone, smart phone, pager, laptop, a general purpose computer, desktop, personal digital assistant, tablet computer, mainframe computer, or any other computing device as may be obvious to a person skilled in the art.

As used herein, a "network"/"communication network" refers to any medium that connects one or more elements/modules/devices/server within or to the system encompassed by the preset disclosure. A network may be a wired network, a wireless network or a combination thereof. A network includes, but is not limited to, personal area network, local area network, metropolitan area network, wide area network, Internet, or any combination thereof. A network may even be a storage area network, virtual private network, enterprise private network or a combination thereof.

As used herein, a "processor unit", a "processing engine" and a "processor" includes one or more processors, wherein processor refers to any logic circuitry for processing instructions. A processor may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), etc. The processor may perform signal coding, data processing, power control, input/output processing, and/or any other functionality that enables the working of the system according to the present disclosure.

As used herein, a "memory", "database" and "storage unit" refers to any non-transitory media that stores data and/or instructions that cause a machine to operate in a specific manner. The disclosed embodiments may encompass a memory, wherein the memory includes a volatile memory or a non-volatile memory. Non-volatile memory includes, for example, a storage device such as magnetic disk, optical disk, solid state drives, or any other storage device for storing information and instructions. Volatile memory includes, for example, a dynamic memory. The disclosed embodiments may further encompass a memory, wherein the memory is single or multiple, coupled or independent, is positioned at device level or server level and encompasses other variations and options of implementation as may be obvious to a person skilled in the art.

General Overview

A system and method for providing contents similar to a first searched item, in accordance with the present disclosure, are described. In general, the system and method, in accordance with example embodiments of the present disclosure, allows a user to view/retrieve content similar to an item searched by the user.

Figure 1:
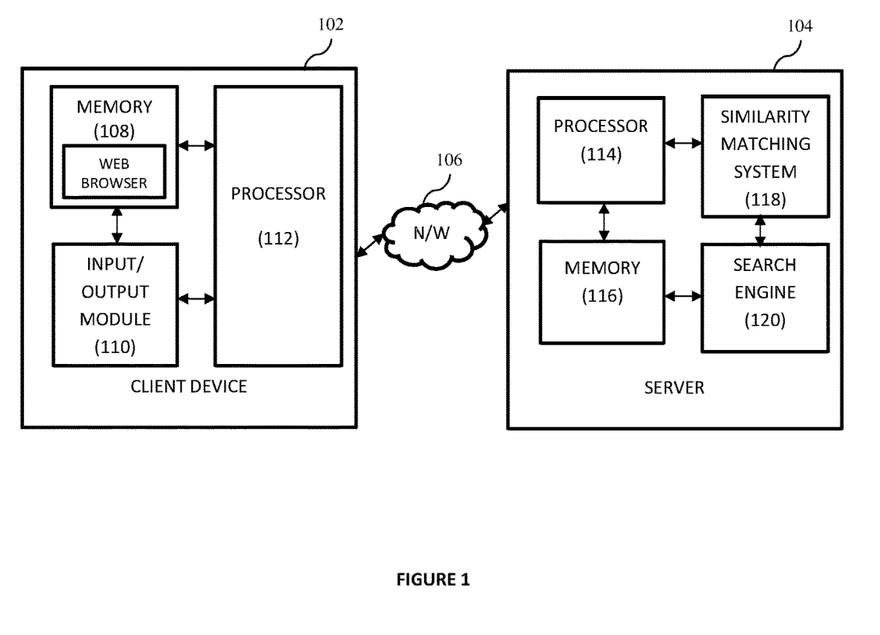
FIG. 1 illustrates a general overview of the system and method for providing contents similar to a first searched item in communication with an exemplary environment, in accordance with an example embodiment of the present disclosure.

As shown in FIG. 1, the system 118 for providing contents similar to a first searched item, also referred to as the similarity matching system, is located on a web server 104. A client device 102 comprises of at least a memory 108, an input/output module 110 and a processor 112, wherein the client device 102 interacts, via a network 106, with a web server 104 comprising at least a memory 116, a processor 114, a search engine 120 and a similarity matching system 118.

A user may search for a first searched item on a web browser located on a client device 102, where the client device 102 interacts with the web server 104 via a network 106 to perform a search on the search engine 120 and receive search results for the first searched item. In order to receive contents similar to the first searched item, the search engine 120 interacts with the similarity matching system 118, which then generates and provides the similar content, in accordance with the example embodiments of the present invention. The similar content provided by the similarity matching system 118 is then provided to the user via the network 106 and the client device 102. All components of the client device 102 and the web server 104, as may be known and obvious to a person skilled in the art, are not illustrated and discussed in detail herein, for the sake of brevity.

Though only one client device 102 has been shown in FIG. 1, the invention encompasses multiple client devices that can interact with the web server 104 simultaneously. Further, it will be appreciated that the environment in which the similarity matching system 118 is implemented in FIG.

1 is only exemplary and other uses and/or implementations of the system 118 are possible.

System Overview

Figure 2:
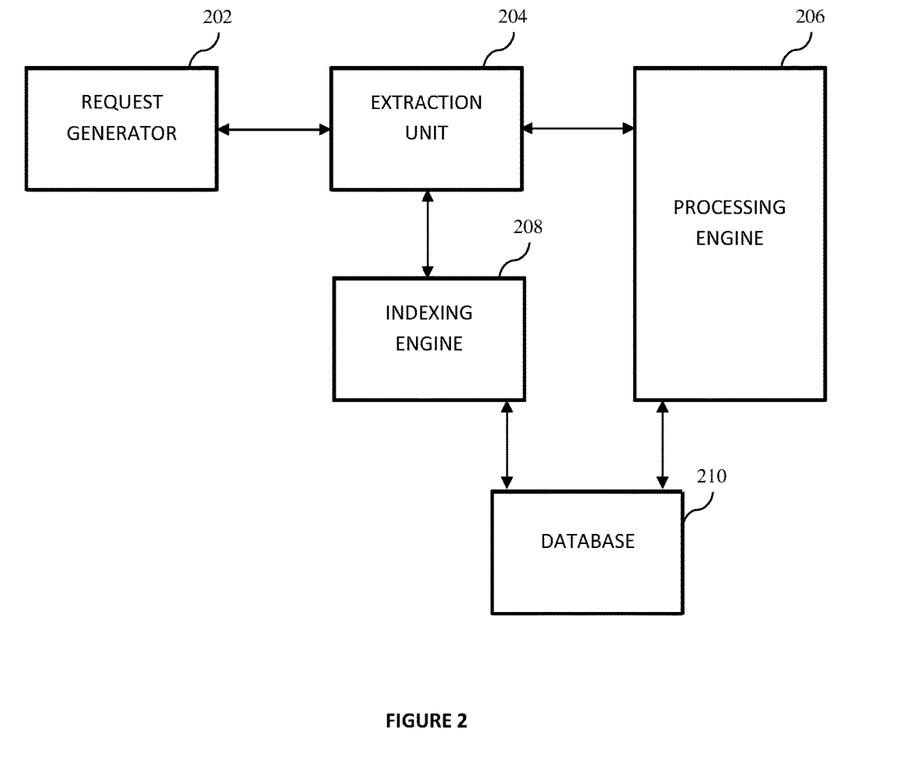
FIG. 2 illustrates a block diagram of a system for providing contents similar to a first searched item, in accordance with an example embodiment of the present disclosure.

FIG. 2 illustrates a similarity matching system, for providing contents similar to a first searched item, in accordance with an example embodiment of the present disclosure. As shown in FIG. 2, the system 118 comprises of a request generator 202 connected to an extraction unit 204 which is also connected to an indexing engine 208 and a processing engine 206. The system 118 may also comprise of a database 210 connected to the indexing engine 208 and the processing engine 206. Although communication links between different units/modules have been shown in FIG. 2 with solid lines, it will be appreciated that the invention encompasses a system 118 wherein other communication links are possible between different units thereof.

The request generator 202 is configured to generate one or more requests for providing contents similar to the first searched item, wherein this request may be automatically generated by the system 118 or based on a request received from the user. A unique item number is assigned to each searched item. The request generator 202 is capable of generating two or more requests simultaneously. Further, the request generator 202 is configured to provide this request's to the extraction unit 204.

The extraction unit 204 is configured to receive the request's generated by the request generator 202 and process it to extract one or more fields/categories related to the first searched item. The invention encompasses an extraction unit 204 further comprising a storage unit (not shown in FIG. 2) configured to store the request's received from the request generator 202 and the extracted fields corresponding to the first searched item. The extraction unit 204 is configured to provide information processed by and/or stored therein to the indexing engine 208 and the processing engine 206.

The indexing engine 208 is configured to receive the fields (of the first searched item) extracted by the extraction unit 204, and generate an index corresponding to each new field and subsequently store it in the database 210. If an index for an extracted field already exists, no new index is generated. Further, the indexing engine 208 assigns the first searched item and/or its unique item number to each of the generated/already existing indices.

The indexing engine 208 is configured to process said fields to form one or more combinations thereof. The indexing engine 208 also determines a score for each such combination based on weights assigned to the fields corresponding to the combination, wherein said weights may be pre-defined or dynamically updated by the user and/or the administrator of the system 118. The indexing engine 208 is also configured to determine a dataset relating to each combination. The combinations and their corresponding scores and datasets are stored in the database 210. The indexing engine 204 is discussed in detail below with reference to FIG. 3.

Based on the score and dataset relating to one or more combinations determined by the indexing engine 208, the processing engine 206 is configured to provide one or more content similar to the main searched item.

The database 210 is configured to store all information/data created, processed and/or stored in any/all of the components of the system 118. More particularly, the database 210 stores requests generated by the request generator 202 and a list of searched items. In an embodiment, the requests stored in the database 210 are associated with a unique request number that facilitates the scheduling unit to effectively schedule these requests, and the searched items are associated with a unique item number. Further, the database 210 also stores the extracted fields/categories related to the first searched item. In a preferred embodiment, the database stores each extracted field as an index and the searched items and/or their unique item numbers are stored in these one or more indices, wherein these indices are updated periodically. The size of an index is determined by the number of items present in the index. Furthermore, the database 210 is also configured to store weights assigned to the fields, combinations of fields and scores and dataset relating to each combination.

Figure 3:
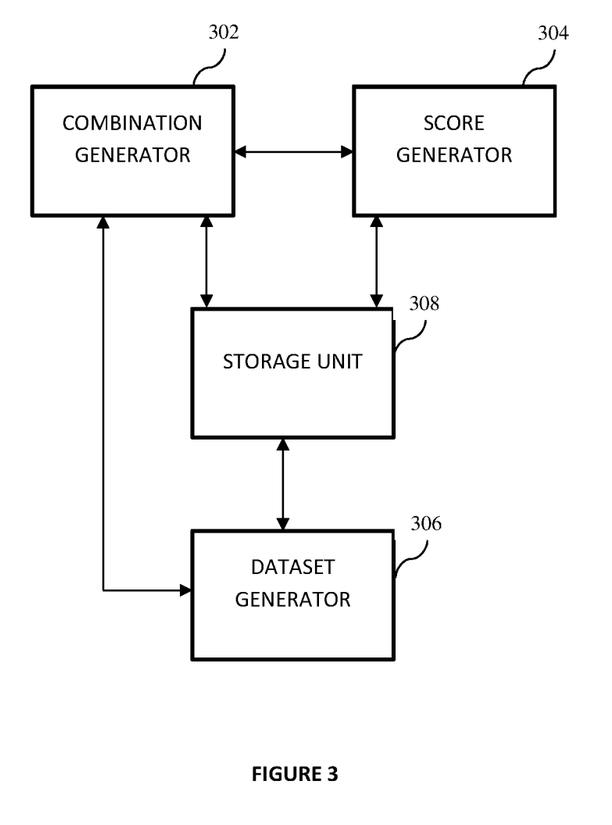
FIG. 3 illustrates a block diagram of an indexing engine in accordance with an example embodiment of the present disclosure.

FIG. 3 illustrates the indexing engine 208 of the system 118, wherein the indexing engine 208 comprises of a combination generator 302, a score generator 304, a dataset generator 306 and a storage unit 308. The combination generator 302 is configured to receive extracted data fields of the first searched item and form one or more combinations thereof. The combination's are provided to the score generator 304, the dataset generator 306 and/or the storage unit 308. The score generator 304 is configured to generate a score of each of the generated combinations using the weights of corresponding fields for said combinations and stores these scores in the storage unit 308. The weights of the fields may be retrieved from the storage unit 308 and/or the database 210. In an embodiment, the score of a combination generated by the score generator 304 is a weighted sum of the corresponding fields of that combination.

The dataset generator 306 is configured to receive combinations generated by the combination generator 302 and determine a dataset relating to each combination. The process of determining these datasets are explained in detail herein below with reference to FIG. 5. The storage unit 308 is configured to store any/all data or information received, transmitted, used and/or processed by the indexing engine 208 and the components thereof. More particularly, the storage unit stores the combinations generated by the combination generator 302. In an embodiment, the storage unit also stores unique numbers/codes assigned to the first searched item and its corresponding combinations, wherein these unique numbers help in identifying which combinations pertain to which searched item. In a preferred embodiment, the combinations stored in the storage unit 308 are represented via bitmasks, such as combinations of three fields may be represented like [1, 1, 0], [1, 0, 1], [1, 0, 0], etc. The storage unit 308 is further configured to store the scores generated by the score generator 304 and the datasets generated by the dataset generator 306.

In an embodiment, the system 118 comprises of a smart price module that works in communication with the processing engine 206 and the database 210. The smart price module is configured to compare the price of a first searched item on an e-commerce platform and compare said price with the price of the similar items/content provided by the processing engine 206. The smart price module modifies the price of the first searched item based on some pre-defined rules. For instance, a rule may be to modify the price of an item such that it is always 5% lesser than the price of similar content/items. In this case, the smart price module compares the price of the first searched item with the price of the similar items/content and modifies this price in accordance with this rule. Further, the smart price module is also configured to keep track of the prices of the items in the database 210 and dynamically update the prices of the searched items in accordance with the pre-defined rules, every time a price of the similar item is changed.

Method Overview

Figure 4:
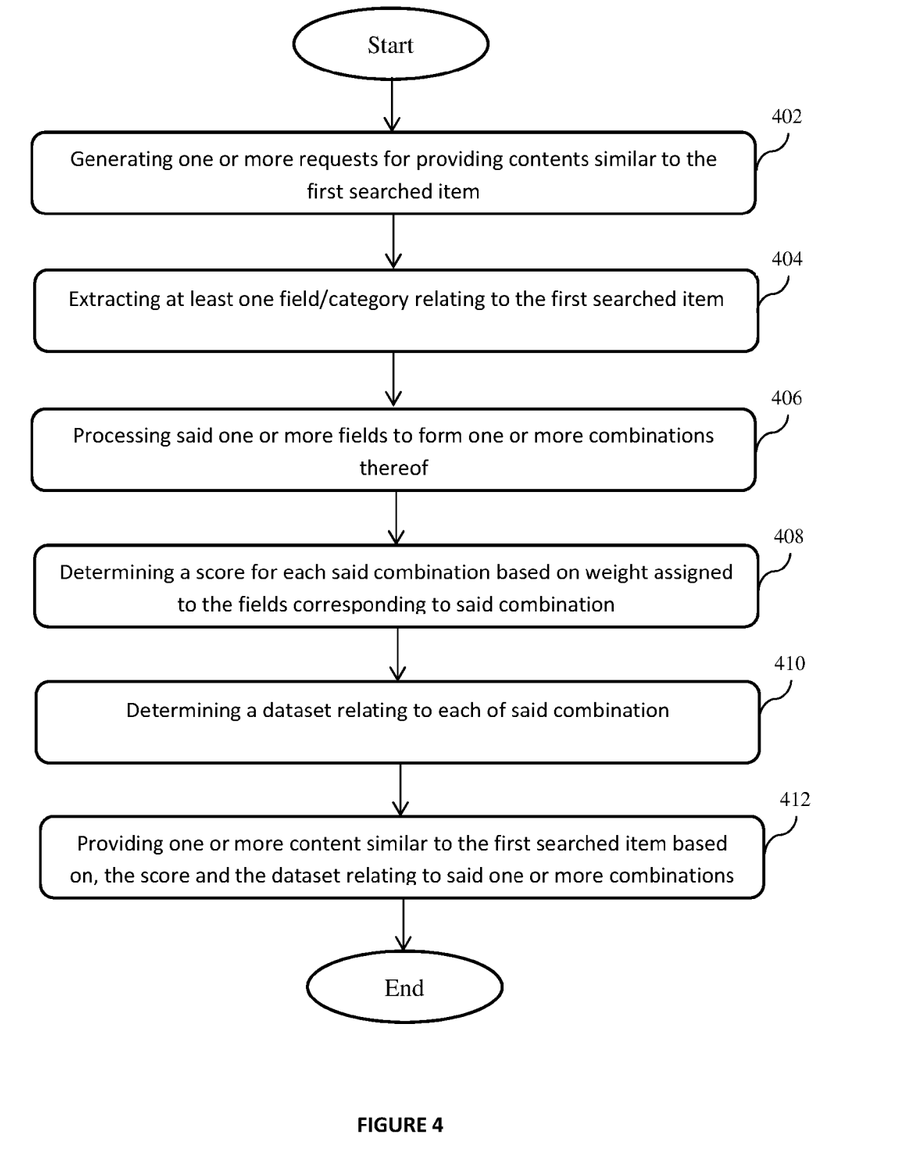
FIG. 4 illustrates a process flow diagram for a method for providing contents similar to a first searched item, in accordance with an example embodiment of the present disclosure.

FIG. 4 illustrates a method for providing contents similar to a first searched item, in accordance with example embodiments of the present disclosure. The method 400 begins at step 402 wherein one or more requests for providing contents similar to the first searched item are generated, wherein these requests are generated by the user or are automatically generated by the system when a search result corresponding to the first searched item is prepared/displayed to the user. In an embodiment where multiple requests are generated, the method 400 includes scheduling (not shown in FIG. 4) said requests such that they can be processed consecutively or simultaneously by the system 118.

After the request/s for providing contents similar to the first searched item is generated, one or more fields/categories related to the first searched item are extracted at step 404. The invention encompasses comparing said first searched item with the previously searched items to determine if extraction for this first searched item has previously been performed by the system 118. If the first searched item has not been previously searched for, this step includes parsing the first searched item and identifying the categories already assigned to said item. For instance, if the first searched item is a blue Adidas shirt for women (associated with a unique item no. item 1), the fields/categories extracted during step 404 are Colour_Blue, Brand_Adidas, Product Type_Shirt and Gender_Women. Next, it is determined if the extracted fields include any blank values, in which case the fields are normalized. For instance, the brand of the first searched item may not have been specified in the brand field but may be included in the name field. In such a case, the extracted fields are normalized to generate proper fields.

Subsequently, the extracted fields are compared to the already stored fields/indices in the database 210 (not shown in FIG. 4). If the extracted field is not found in the database 210, a new index for this corresponding field is generated and stored. The first searched item and/or its unique item number is then stored in all the indices of the extracted fields corresponding to this searched item. For instance, in the above example, the extracted fields Colour_Blue, Brand_Adidas, Product Type_Shirt and Gender_Women are searched in the database 210, and if an index corresponding to the field Colour_Blue is not found, a new index Colour_Blue_index is generated and stored in the database 210. Subsequently, the item 1 is stored in all the indices Colour_Blue_index, Brand_Adidas_index, Product Type_Shirt_index and Gender_Women_index.

Next, the fields extracted during step 404 are processed at step 406 to form one or more combinations of said fields. For instance, in the above example the following combinations may be formed:
Combination 1=Colour_Blue, Brand_Adidas
Combination 2=Brand_Adidas, Product Type_Shirt
Combination 3=Colour_Blue, Brand_Adidas, Product Type_Shirt At step 408, a score for each of the combinations is determined based on weight assigned to the fields corresponding to said combination. In an embodiment, determining a score of a combination includes summing up the individual weights assigned to the corresponding fields of that combination. For instance, in the above example, given the weights of the fields, the scores for the combinations may be calculated as provided below:

Weights: Brand=40
Colour=30
Gender=60
Product type=70
Scores: Score (Combination 1)=30 (Colour_Blue)+40 (Brand_Adidas)=70
Score (Combination 2)=40 (Brand_Adidas)+70 (Product Type_Shirt)=140

At step 410, a dataset relating to each combination is determined. This step has been illustrated in detail with reference to FIG. 5. After the dataset for each combination is determined, the process proceeds to step 412, wherein one or more content similar to the first searched item is provided based on the score determined at step 408 and the dataset determined at step 410. In an embodiment, step 412 includes retrieving dataset relating to the combinations in the order of decreasing scores, i.e. dataset relating to the combination having the highest score is retrieved first, followed by retrieving the dataset relating to the combination having the second highest score, and so on. The retrieved datasets are processed to provide the content relating to the first searched item. This ensures that the most relevant datasets are included in the content provided to the user. In an embodiment, if the dataset relating to the combination having the highest score is equal to or greater than a threshold value, then no other datasets from other combinations are retrieved, and the content provided by the processing engine 118 is based only on the dataset relating to the combination having the highest score.

Further, the invention encompasses maintaining a list of blacklist combinations, wherein blacklist combinations are those combination of fields for which the dataset is an empty or null set, i.e. there are no items/content in the dataset of that combination. In a preferred embodiment, the content similar to the first searched item, provided by the system 118, is not based on the score and the dataset relating to, the blacklist combinations.

Figure 5:
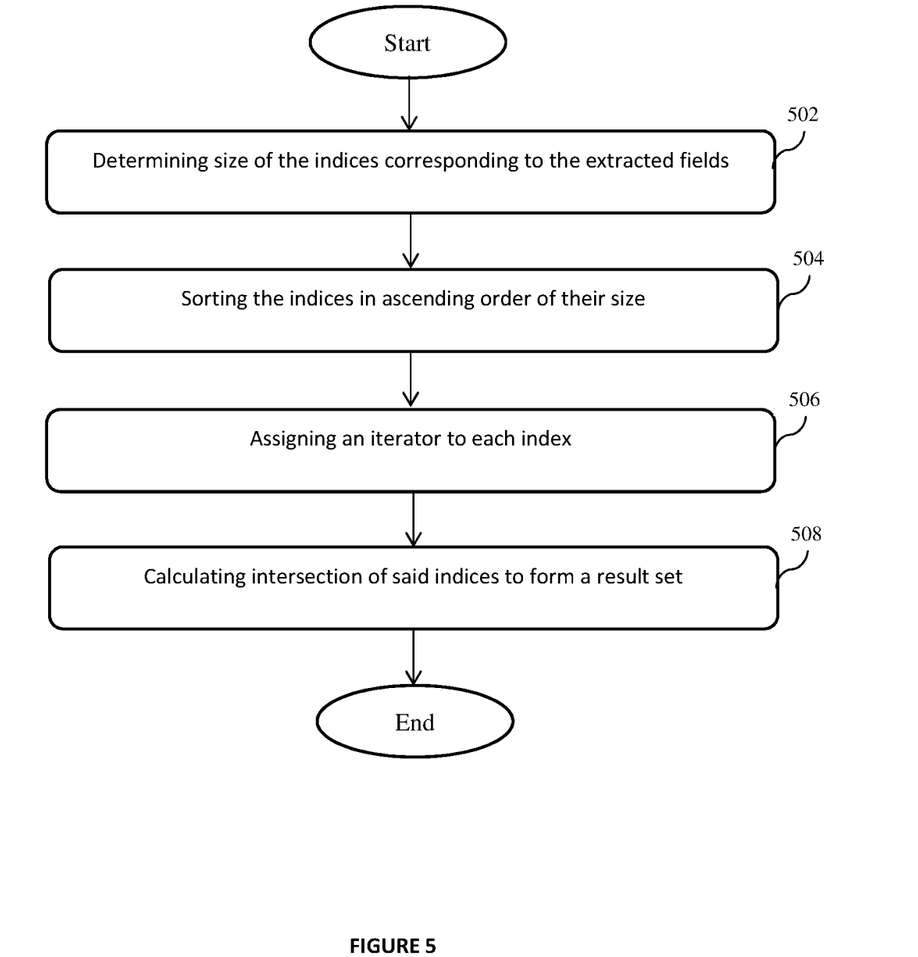
FIG. 5 illustrates a process flow diagram for a method for determining a dataset relating to a combination of fields, in accordance with an example embodiment of the present disclosure.

FIG. 5 illustrates a method of determining a dataset relating to combinations of fields. The process begins at step 502 where the size of the indices corresponding to the extracted fields is determined. Subsequently, at step 504, the indices determined in step 502 are sorted in ascending order of their size and the process proceeds to step 506 where each index is assigned an iterator. Using these iterators, intersection of the indices are calculated and a result set is formed, wherein the result set comprises datasets corresponding to different combinations of these indices. The dataset relating to a combination contains items common to the corresponding indices of the fields of the combination.

While the processes discussed above have been illustrated with the help of flow diagrams, wherein each process comprises of a certain number of steps, however, it will be appreciated by those skilled in the art that the order of the steps as shown in the flow diagrams is only exemplary and these processes may be implemented with a different order of these steps. Additionally, some of the steps as discussed hereinabove may be optional and therefore, the objective of the invention may be accomplished even without implementing these steps.

While the present disclosure has been particularly shown and described with references to example embodiments thereof, it will be appreciated by those skilled in the art that various changes in form and details may be made therein without departing from the scope of the present disclosure.

What is claimed is:

1. A system located in a web server for providing contents similar to a first searched item, the system comprising:
 a request generator, for generating one or more requests for providing contents similar to the first searched item;
 an extraction unit, associated with the request generator, for extracting at least one field/category relating to the first searched item, the extraction unit comprising a storage unit configured to store the request received from the request generator and extracted fields corresponding to the first searched item;
 an indexing engine, associated with said extraction unit, for
  processing said one or more fields to form one or more combinations thereof,
  determining a score for each said combination based on dynamically updated weight assigned to the fields corresponding to said combination, and
  determining a dataset relating to each of said combination,
 the combinations, their corresponding scores and datasets being stored in a database; and
 a processing engine, associated with the extraction unit and the indexing engine, for providing one or more content similar to the first searched item based on, the score and the dataset relating to said one or more combinations;
 the web server comprising at least a memory, a processor and a search engine interacts with a client device comprising at least a memory, an input/output module and a processor via a network.

2. The system of claim 1 wherein the score of each of said combinations is a weighted sum of the fields corresponding to said combination.

3. The system of claim 1 wherein weights of said fields are one of pre-defined, dynamically updated, or a combination thereof.

4. The system of claim 1 may further comprise a scheduler unit, associated with the request generator and the extraction unit, for scheduling the one or more requests generated by the request generator.

5. A method for providing contents similar to a first searched item, the method comprising:
 generating one or more requests for providing contents similar to the first searched item;
 extracting at least one field/category relating to the first searched item;
 storing the extracted field/category corresponding to the first searched item in a storage unit;
 processing said one or more fields to form one or more combinations thereof;
 determining a score for each said combination based on dynamically updated weight assigned to the fields corresponding to said combination;
 determining a dataset relating to each of said combination,
 storing the combinations, their corresponding scores and datasets in a database; and
 providing one or more content similar to the first searched item based on, the score and the dataset relating to said one or more combinations.

6. The method of claim 5 may further comprise determining a list of blacklist combinations for said first searched item.

7. The method of claim 5 wherein said blacklist sub-combinations may not be used for providing the one or more content similar to the first searched item.

8. The method of claim 5 wherein the one or more requests may be scheduled based on a pre-determined criterion.

* * * * *